Oct. 17, 1933.　　　C. D. RYAN　　　1,930,943
CLUTCH CONTROL
Filed Feb. 18, 1929
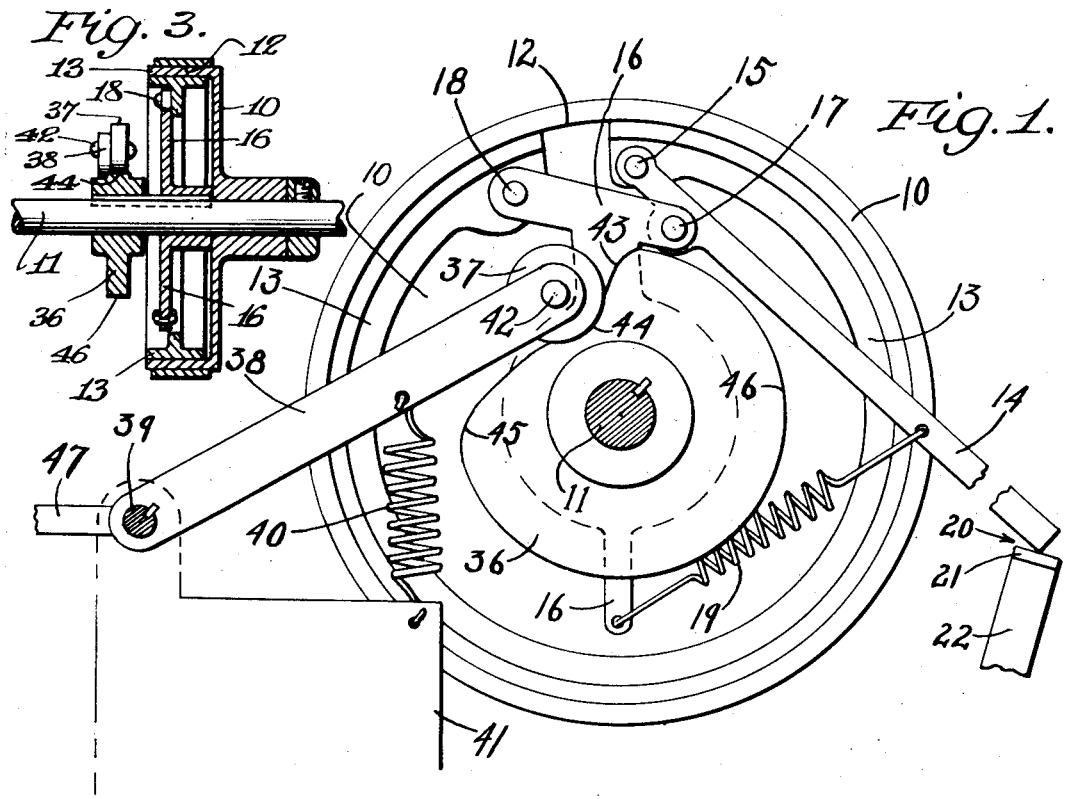
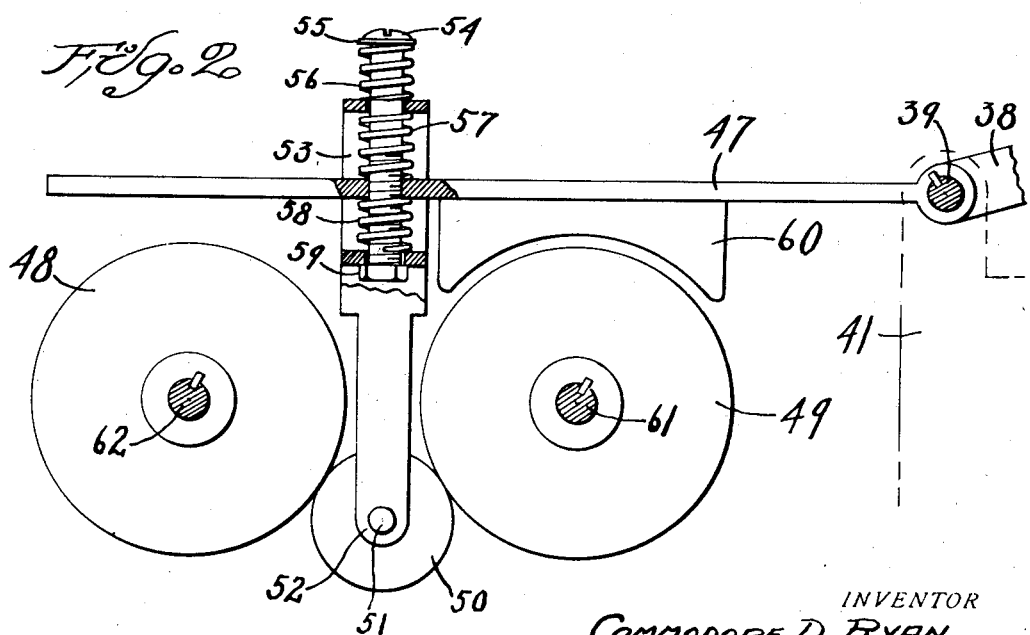
INVENTOR
Commodore D. Ryan,
BY R. George Orwig, ATTORNEY Patented Oct. 17, 1933

1,930,943

UNITED STATES PATENT OFFICE 1,930,943

CLUTCH CONTROL

Commodore D. Ryan, Los Angeles, Calif., assignor, by mesne assignments, to National Postal Meter Company, a corporation of California Application February 18, 1929. Serial No. 340,946

2 Claims. (Cl. 192—144)

This invention relates to cycle, or time, relating two functionately distinct mechanisms and more particularly to means in a postal machine for relating the operations of a clutch controlled drive of an indicia printing means with the operations of a clutch controlled drive of a letter conveyor.

Objects of my invention are—

To provide in mail marking machines a clutch control of relatively compact construction, light of weight, simplicity of parts and economy of construction, to be actuated by a very light contact by a trip mechanism; to provide a means for instant and positive clutch actuation and release, to provide means for positive positioning of the control arm in relation to the trip upon the completion of each cycle of the clutch.

A further object of my invention is to provide means for automatically completing a cycle of the clutch and the positive positioning of the same, at the completion of every cycle of its operation, at a predetermined point, by the simplest and most effective construction.

And a further object of my invention is to provide a positive means of simple construction for the control and operation of a secondary clutch, designed to control movement of a driven apparatus, such as a conveyor and feeder and moistener mechanism of a postal machine in which intermittent movement of the recited parts is required.

To the above purposes my invention consists in the novel construction, arrangement and combination of parts as hereinafter fully, clearly and concisely described, definitely pointed out in my claims and illustrated by the accompanying drawing (1 sheet) in which—

Fig. 1 is an end elevation of the clutch and the control mechanism.

Fig. 2 is an end elevation partly in section of the secondary clutch.

Fig. 3 is a vertical sectional view taken through the clutch mechanism shown in Fig. 1.

The control movements of the clutch originate thru arm 14 at contact point 20, when arm 21 is actuated by a trip, not shown, and contact face 22 is removed from contact point 20, allowing free movement of arm 14.

Pulley wheel, or clutch element, 10 is a continuously driven member with an inner face 12 against which is frictionally engaged clutch member 13 supported and actuated for engagement and disengagement by clutch carriage 16 pivotally connected by pin 18 to clutch member 13, and further pivotally connected by pin 17 to arm 14 and pin 15 to clutch member 13.

Clutch carriage 16 is key related to shaft 11, which is, or may be, connected to a postal indicia printing press, and the opposite portion of carriage 16 is shaped to secure one end of a tension spring 19 the other end of which is connected to arm 14, which functions upon the release of arm 21, thru arm 14 to expand clutch member 13 to engagement with face 12, it being clear that rightward movement of arm 22, as viewed in Fig. 1, carries the contacting face 21 of this arm out from under the arm 14.

Upon the completion of a cycle of operation of the clutch the contact face 22 of arm 21 having been returned to contact position 20 in the path of the rotation of arm 14, acts to stop arm 14 upon contact, thus contracting the clutch member 13 and removing it from contact with face 12.

To complete the cycle of movement to positive predetermined point of rest (required for the efficient successive operations of a printing press which may be driven by shaft 11) there is provided a cam 36, key related to shaft 11, which cam 36 has a face 46, a certain length of which as at 43 presents to the roller 37 an angularity of contact forming a lever upon the shaft 11, which with the power derived from a sufficiently powerful spring such as 40, acting thru arm 38, rotatively carrying roller 37, by means of pin 42, functions to further rotate and complete the cycle of operation of the cam and clutch parts by pressure upon the angular cam face 43, and as cam 36 rotates, roller 37 functions to seat in dwell 44, and this positioning together with the contact as described at point 20 locks the cam and clutch in a positive predetermined point against further operation until released by operation of arm 21 to that end.

Cam 36 has a length of its face 46 designed to operate as an eccentric lifting cam surface 45, which upon the rotation of cam 36 lifts roller 37 and arm 38 to the face 46 at which plane they remain during the rotation of the length of cam face 46, and this movement of the arm 38 which is key related to a shaft 39 rotates shaft 39 having key related to it a secondary clutch arm 47 carrying brake 60, clutch carriage 53, adjustable riding pin 54, washer 55, riding springs 56, 57, 58 secured by nut 59, the lower section of carriage 53 being a bearing 52 for pin 51 and friction clutch roller 50 operating between a power driven friction drum 48, and a drum 49 to which it conveys the said power upon engagement, said drum 49 thru its key related shaft 61 may operate connected mechanism, such as a postal machine conveyor and feeder which requires the intermittent movement hereby delivered.

Roller arm 38 being continuously spring tensioned by spring 40 against the face 46 of cam 36, closely following the various contours, as recited, functions during a cycle of the clutch, first, to operate the secondary clutch to disengage the friction clutch roller 50 and apply the brake 60; second, to hold that relation throughout the travel of the cam face 46; third, to complete the cycle of the cam and clutch to a predetermined point of stoppage thru its action on cam face 43, fourth upon the return of the roller 37 to the dwell 44 and the consequent movement of the connecting parts, disengages brake 60 and engages clutch roller 50; fifth, acts to maintain the point of contact at 20 for a release movement by arm 22; sixth, acts for a full contraction of clutch member 13 thus disengaging it from face 12, and seventh when roller 37 seats in dwell 44 and with arm 14 contacting arm 22 at point 20, acts to lock the entire clutch mechanism against movement in either direction until released by arm 22 at point 20.

Thus I have provided in my invention a simple and efficient mechanism for furnishing intermittent power supply, as controlled by two clutches. With a source of power supply driving pulley 10 of the clutch and the same source of power driving drum 43 of the secondary clutch, with the secondary clutch normally engaged, as to drive the conveyor of a postal machine which may be connected to shaft 61, and with a postal printing press which may be connected to shaft 11, which together with the cam 36, clutch member 13, and its connecting parts are normally at rest, actuation by a mail piece being conveyed by a conveyor to engage a trip may actuate arm 22 and trip the clutch mechanism, starting the rotation of the clutch and its connections to rotate once only, and coacting to stop the secondary clutch and its connections while a printing press is being operated, furnishes an intermittent power supply alternately to a printing press and to a conveyor, controlled by the mail pieces being conveyed thereon.

The form of the device illustrated and described herein is submitted in accordance with statutory requirement by way of exhibiting one form of embodiment of my invention. Various changes, alterations or modifications of the structure may be made without departure from my invention as defined in the following claims.

It is to be noted in Fig. 1 that the pulley wheel 10 provides a sort of drum which rotates continuously coaxially with the shaft 11, and is preferably rotated by a belt (not shown) which is trained about this pulley wheel. The clutch member 13 which, with the cam 46, is keyed to the shaft 11 is normally stationary and remains so as long as the control arm 21 is in contact with the lower end of the stop arm 14. When the clutch is thus positioned the resistance of the spring 40 to the lifting of the roller 37 from the dwell 44 prevents rotation of the cam 46 and accordingly the clutch member 13, which rotation would cause the expansion of this clutch member so that it would grip the pulley wheel 10. It is thus seen that the clutch is maintained in freely disengaged position after its having been thrown out by the engagement of the stop arm 14 with the contact arm 21, by the spring 40 urging the roller 37 into the dwell 44. Whenever the contact arm 21 is moved so as to disengage stop arm 14 however, the spring 19 quickly swings the stop arm relative to the clutch carriage thereby expanding the internal clutch member 13 so that this contacts pulley wheel 10 and by this frictional engagement causes the clutch member 13, with its associated parts, to rotate with the constantly rotating pulley wheel 10. This rotation, of course, may continue only one revolution providing the contact arm 21 is moved back into the path of the stop arm 14. As long, however, as the contact arm 21 is held out of the path of the stop arm 14, the clutch member 13 and the shaft 11, upon which this is fixed, are caused to rotate with the continuously rotating pulley wheel 10.

I claim:

1. In a clutch mechanism, the combination of a clutch including drive and driven members; spring actuated control means on said driven member adapted to normally hold said clutch in engagement; a trip adapted to intercept said control means to disengage said clutch when said driven member arrives at a given position; a cam including a dwell and provided to rotate with said driven member; a follower; and means for yieldably urging said follower against said cam, said dwell being so located that when said control means engages said trip to throw out said clutch, said driven member is positioned by said follower engaging said dwell so as to maintain said clutch freely disengaged until said trip is again moved out of contact with said clutch control means.

2. A combination as in claim 1 in which said drive member and said driven member and said cam are mounted on a shaft and said drive member is freely rotatable thereon.

COMMODORE D. RYAN.